US012602178B2

(12) United States Patent
Liu

(10) Patent No.: US 12,602,178 B2
(45) Date of Patent: Apr. 14, 2026

(54) DETERMINING TARGET CALCULATION MODELS THAT NEED MEMORY ALLOCATION

(71) Applicant: SigmaStar Technology Ltd., Fujian (CN)

(72) Inventor: Xiaolong Liu, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 1297 days.

(21) Appl. No.: 17/385,106

(22) Filed: Jul. 26, 2021

(65) Prior Publication Data

US 2022/0035544 A1 Feb. 3, 2022

(30) Foreign Application Priority Data

Jul. 31, 2020 (CN) .......................... 202010761757.8

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/0673* (2013.01); *G06F 9/5016* (2013.01)

(58) Field of Classification Search
CPC .... G06F 3/0631; G06F 3/0604; G06F 3/0673; G06F 9/5016; G06N 3/0454; G06N 3/063; G06N 3/08; G06N 20/00; G06N 3/045; G06N 3/0464
See application file for complete search history.

(56) References Cited

U.S. PATENT DOCUMENTS

| | | | |
|---|---|---|---|
| 11,562,213 B2 * | 1/2023 | Choe ...................... | G06N 3/045 |
| 2023/0035451 A1 * | 2/2023 | Gao ...................... | G06N 20/00 |

FOREIGN PATENT DOCUMENTS

CN 112529169 B * 8/2024 ........... G06F 9/5016

* cited by examiner

*Primary Examiner* — Arpan P. Savla
(74) *Attorney, Agent, or Firm* — Edell, Shapiro & Finnan, LLC

(57) ABSTRACT

The present application discloses a memory allocation method, including: determining a plurality of target calculation models that need memory allocation; determining a target tensor of each of the target calculation models which a memory occupancy is needed during a calculation process; determining, according to lifecycles of the target tensors, a target memory space occupied by each of the target calculation models during the calculation process; and determining, according to the target memory spaces occupied by the target calculation models, a total memory space occupied by the target calculation models. Thus, an electronic apparatus is not required to allocate memory spaces for all the tensors, achieving the object of reducing the memory space occupied by calculation models.

12 Claims, 11 Drawing Sheets

Determine target calculation model

Determine target tensor

Determine target memory space

Total memory space

Electronic apparatus

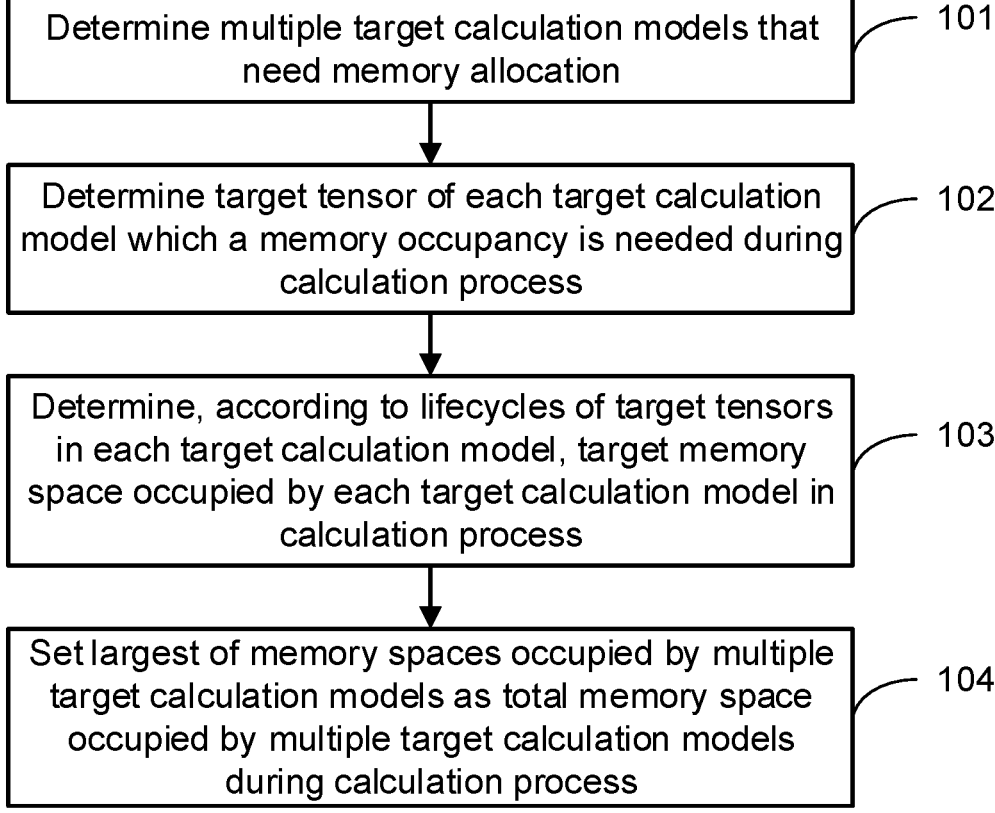

Determine multiple target calculation models that need memory allocation — 101

Determine target tensor of each target calculation model which a memory occupancy is needed during calculation process — 102

Determine, according to lifecycles of target tensors in each target calculation model, target memory space occupied by each target calculation model in calculation process — 103

Set largest of memory spaces occupied by multiple target calculation models as total memory space occupied by multiple target calculation models during calculation process — 104

FIG. 2 t1    Target tensor A | Target tensor B t2    | Target tensor B t3    | Target tensor B | Memory space of which occupancy needed by target tensor C

| Target tensor B | Target tensor C t4    | | Target tensor C t5    Target tensor D | | Target tensor C

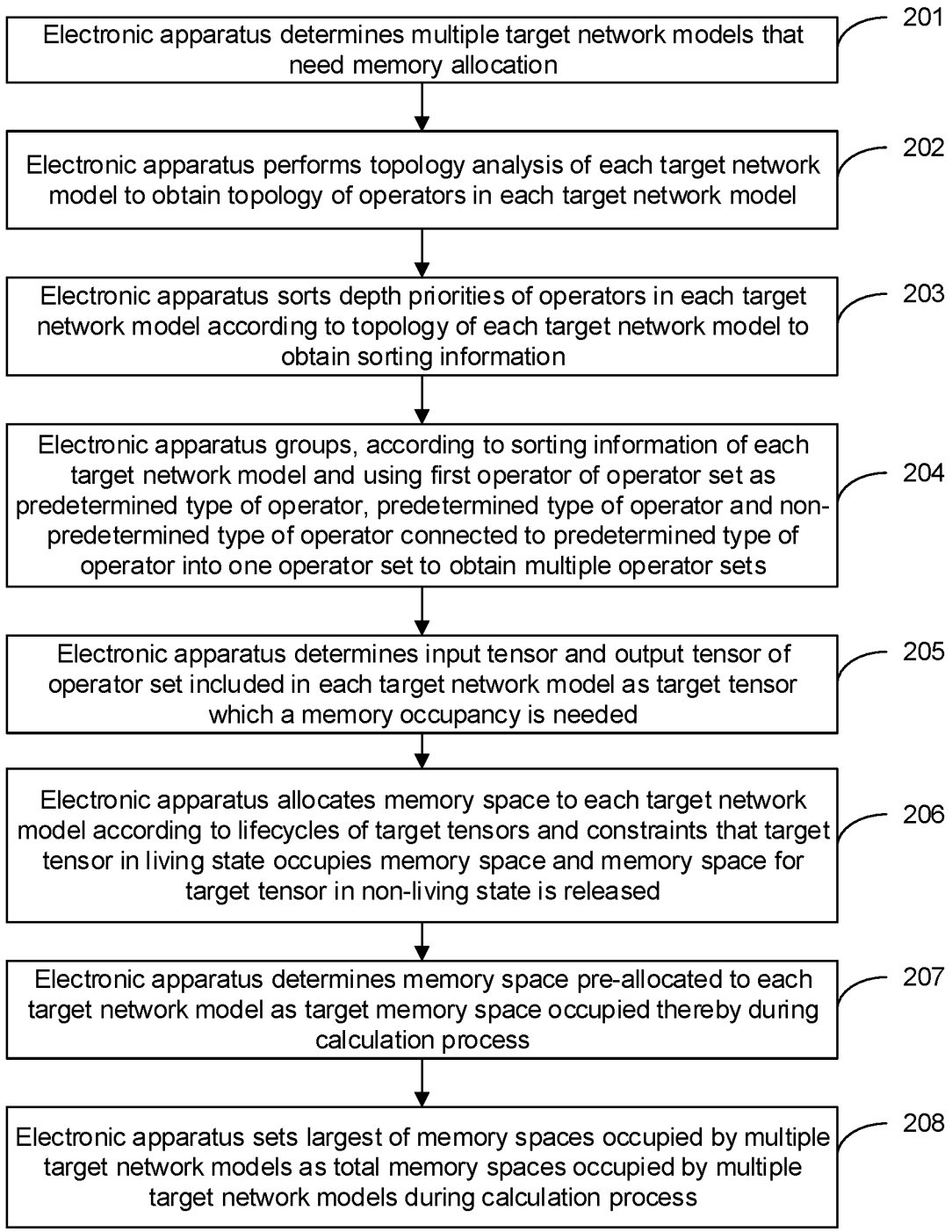

Electronic apparatus determines multiple target network models that need memory allocation — 201

Electronic apparatus performs topology analysis of each target network model to obtain topology of operators in each target network model — 202

Electronic apparatus sorts depth priorities of operators in each target network model according to topology of each target network model to obtain sorting information — 203

Electronic apparatus groups, according to sorting information of each target network model and using first operator of operator set as predetermined type of operator, predetermined type of operator and non-predetermined type of operator connected to predetermined type of operator into one operator set to obtain multiple operator sets — 204

Electronic apparatus determines input tensor and output tensor of operator set included in each target network model as target tensor which a memory occupancy is needed — 205

Electronic apparatus allocates memory space to each target network model according to lifecycles of target tensors and constraints that target tensor in living state occupies memory space and memory space for target tensor in non-living state is released — 206

Electronic apparatus determines memory space pre-allocated to each target network model as target memory space occupied thereby during calculation process — 207

Electronic apparatus sets largest of memory spaces occupied by multiple target network models as total memory spaces occupied by multiple target network models during calculation process — 208

FIG. 11

DETERMINING TARGET CALCULATION MODELS THAT NEED MEMORY ALLOCATION

This application claims the benefit of China application Serial No. CN202010761757.8, filed on Jul. 31, 2020, the subject matter of which is incorporated herein by reference.

BACKGROUND OF THE INVENTION

Field of the Invention

The invention relates to the field of artificial intelligence, and more particularly, to a memory allocation method and device, and an electronic apparatus.

Description of the Related Art

Artificial intelligence (AI) is the theory, method, technology and application system that use computers or machines controlled by computers to simulate, extend and expand human intelligence, sense the environment, acquire knowledge, and use knowledge to obtain optimal results. In other words, AI is a comprehensive technology of computer science; it aims to understand the essence of intelligence and produces a novel intelligent machine capable of reacting in a way similar to human intelligence. That is, AI is the study of design principles and implementation methods of various intelligent machines, so that the machines have functions of perception, reasoning and decision-making.

With the constant development of artificial intelligence, calculation models are being deployed in electronic apparatuses such as smart phones and tablet computers to reinforce processing capabilities of the electronic apparatuses. For example, an electronic apparatus can optimize an image captured thereby by using an image optimization model deployed therein, so as to optimize the captured image and enhance image quality.

However, a calculation model occupies a large memory space of an electronic apparatus, and this affects normal operations of system and functional applications of the electronic apparatus. In addition, when system and functional applications of an electronic apparatus occupy an overly excessive memory space, the memory space available to the calculation model is limited, which also affects the calculation effect of the calculation model. Therefore, there is a need for a solution for reducing the memory space occupied by a calculation model.

SUMMARY OF THE INVENTION

The present application provides a memory allocation method and device, and an electronic apparatus, which are capable of reducing a memory space occupied by a calculation model.

A memory allocation method provided by the present application includes: determining a plurality of target calculation models that need memory allocation; determining a target tensor of each of the plurality of target calculation models which a memory occupancy is needed during a calculation process; determining, according to lifecycles of the target tensors, a target memory space occupied by each of the plurality of target calculation models during the calculation process; and determining, according to the target memory spaces occupied by the plurality of target calculation models, a total memory space occupied by the plurality of target calculation models during the calculation process.

A memory allocation device provided by the present application includes: a model determining module, for determining a plurality of target calculation models that need memory allocation; a tensor determination module, for determining a target tensor of each of the plurality of target calculation models which a memory occupancy is needed during a calculation process; a space determination module, for determining, according to lifecycles of the target tensors, a target memory space occupied by each of the plurality of target calculation models during the calculation process; and a space setting module, for determining, according to the target memory spaces occupied by the plurality of target calculation models, a total memory space occupied by the plurality of target calculation models during the calculation process.

An electronic apparatus provided by the present application includes a processor and a memory. The memory has a computer program stored therein. The computer performs a memory allocation method when the computer program executed by the processor, wherein the memory allocation method includes: determining a plurality of target calculation models that need memory allocation; determining a target tensor of each of the plurality of target calculation models which a memory occupancy is needed during a calculation process; determining, according to lifecycles of the target tensors, a target memory space occupied by each of the plurality of target calculation models during the calculation process; and determining, according to the target memory spaces occupied by the plurality of calculation models, a total memory space occupied by the plurality of target calculation models during the calculation process.

It is known from the above, the electronic apparatus is capable of allocating a memory region in the size of the total memory space to a plurality of target calculation models for occupancy by the plurality of target calculation models during the calculation process, and the remaining memory region can be used by the electronic apparatus to operate the system and functional applications. Thus, the electronic apparatus may allocate a memory space for merely some tensors during the calculation process of the calculation models and is not required to allocate the memory space to all the tensors, thereby achieving the object of reducing the memory space occupied by the calculation models.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

FIG. 2 is a flowchart of an application scenario of a memory allocation method provided according to an embodiment of the present application;

FIG. 11 is a flowchart of a memory allocation method provided according to another embodiment of the present application;

DETAILED DESCRIPTION OF THE INVENTION

It should be noted that, an example of implementing the principle of the present application in an appropriate operation environment is described below. The description below is an example of a specific embodiment of the present application, and is not to be construed as limitations to other specific embodiments of the present application that are not described herein.

The solutions provided by the embodiments of the present application relate to machine learning techniques of artificial intelligence (AI), and specifically relates to a calculation stage of a calculation model, with associated details given in the embodiments below.

A memory allocation method, a memory allocation device and an electronic apparatus are provided according to embodiments of the present application. The execution entity of the memory allocation method may be a memory allocation device provided according to the embodiment of the present application, or an electronic apparatus provided according to the embodiment of the present application. The memory allocation device may be implemented in form of hardware or software, and the physical presentation form of the electronic apparatus may be an apparatus provided with a processor (for example but not limited to, a universal processor or a dedicated processor, wherein the dedicated processor is such as a neural network processor or a smart processor) such as a smart phone, a tablet computer or an in-vehicle computer, and thus having a processing capability.

Figure 1:
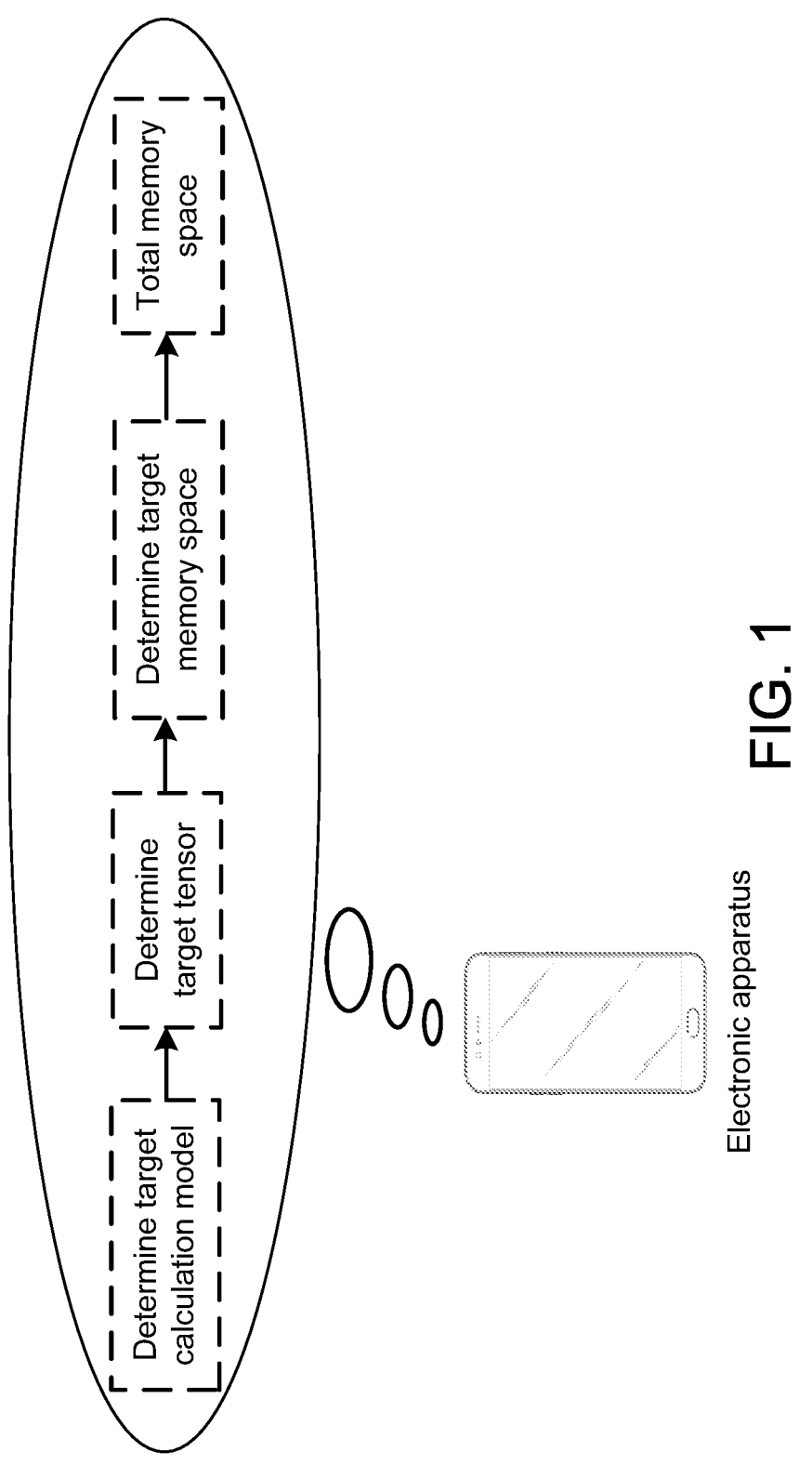
FIG. 1 is a schematic diagram of an application scenario of a memory allocation method provided according to an embodiment of the present application.

Referring to FIG. 1, FIG. 1 shows a schematic diagram of an application scenario of a memory allocation method provided according to an embodiment of the present application, wherein the memory allocation method is applied to a smart phone as an example of the physical presentation form of the electronic apparatus. Referring to FIG. 2, FIG. 2 shows a flowchart of a memory allocation method provided according to an embodiment of the present application, wherein the memory allocation method provided according to the embodiment of the present application may be performed by the electronic apparatus in FIG. 1, with the associated details described below.

In step 101, a plurality of target calculation models that need memory allocation are determined.

An electronic apparatus is used as the execution entity of the memory allocation method in the description below.

It should be noted that, a calculation model (for example but not limited to, a Gaussian model, a regression model or a network model) generates intermediate data during a calculation process, and the intermediate data usually needs to be carried by a memory. Correspondingly, in order to ensure that the calculation can calculate properly, an electronic apparatus needs to allocate a memory to the calculation model.

Correspondingly, in an embodiment of the present application, the electronic apparatus first determines, according to a configured model determination policy, a plurality of calculation models that need memory allocation, and denotes the determined calculation models as target calculation models.

For example, the model determination policy may be configured as: determining all calculation models deployed in the electronic apparatus as target calculation models that need memory allocation.

The model determination policy may further be configured as: determining a calculation model deployed in the electronic apparatus and requiring a memory for calculation in a predetermined period, as a target calculation model that needs memory allocation.

For example, assume that the electronic apparatus is deployed with four calculation models, which are respectively a calculation model A, a calculation model B, a calculation model C and a calculation model D. If the model determination policy is configured as: determining all calculation models in the electronic apparatus as target calculation models that need memory allocation, the calculation model A, the calculation model B, the calculation model C and the calculation model D deployed in the electronic apparatus are determined as a plurality of target calculation models that need memory allocation.

In step 102, a target tensor of each of the plurality of target calculation models which a memory occupancy is needed during a calculation process is determined.

As described above, the tensor serves as intermediate data of the calculation model during the calculation process, and usually needs to be carried by a memory. However, in specific conditions, the tensor generated during the calculation process by the calculation model may be carried by other components other than a memory, for example, carried by a cache in a processor. On this basis, a tensor determination policy is configured in advance in the embodiment of the present application, wherein the tensor determination policy is for describing how a tensor which a memory occupancy is needed is determined, that is, the tensor carried by the memory.

Correspondingly, after determining the plurality of target calculation models that need memory allocation, the electronic apparatus further determines, according to the configured tensor determination policy, the tensor of each of the plurality of target calculation models which a memory occupancy is needed during the calculation process, and denotes the tensor as a target tensor. Accordingly, the electronic apparatus does not allocate a memory to all the tensors generated during the calculation process of the target calculation model but only allocates a memory to some of the tensors.

For example, assume that the calculation model A generates a total of five tensors during the calculation process. According to the configured tensor determination policy, the electronic apparatus may determine one, two, three or four among the five tensors as the target tensors that need memory allocation.

In step 103, a target memory space occupied by each target calculation model during the calculation process is determined according to lifecycles of the target tensors in each target calculation model.

The lifecycle of the target tensor may be understood as an entire cycle of the target tensor from the beginning to the completion of use, and may be divided into two phases, i.e., a living state and a non-living state. On this basis, a space determination policy determined on the basis of the lifecycle is configured, for example, ensuring memory occupancy for only a target tensor in a living state.

In this embodiment, after determining the target tensor of each target calculation model which a memory occupancy is needed during the calculation process, the electronic apparatus further obtains the lifecycles of the target tensors in each target calculation model, determines, according to the lifecycles of the target tensors in each target calculation model, the memory space occupied by each target calculation model during the calculation process, and denotes the memory space occupied as a target memory space.

In step 104, a largest of the target memory spaces occupied by the plurality of target calculation models is set as a total memory space occupied by the plurality of calculation models during the calculation process.

In this embodiment of the present application, after determining the target memory space occupied by each target calculation model during the calculation process, the electronic apparatus further sets the largest of the target memory spaces occupied by the plurality of target calculation models as the total memory space occupied by the plurality of target calculation models during the calculation process, that is, the plurality of target calculation models repeatedly use the memory region in the size of the total memory space.

For example, the electronic apparatus determines three target calculation models, which are respectively a target calculation model A, a target calculation model B and a target calculation model C. Assume that the target memory space occupied by the target calculation model A during the calculation process is 25% of the total memory space of the electronic apparatus, the target memory space occupied by the target calculation model B during the calculation process is 20% of the total memory space of the electronic apparatus, and the target memory space occupied by the target calculation model C during the calculation process is 15% of the total memory space of the electronic apparatus. Thus, the electronic apparatus sets 25% of the total memory space of the electronic apparatus as the total memory space occupied by the target calculation model A, the target calculation model B and the target calculation model C during the calculation process.

It is known from the above, by applying the memory allocation method provided by the present application, the electronic apparatus can allocate a memory region in the size of the total memory space to the plurality of target calculation models for the target calculation models to occupy during the calculation process, and the remaining memory region may be used by the electronic apparatus to operation system and functional applications. Thus, the electronic apparatus may allocate the memory space for merely some tensors during the calculation process of the calculation models and is not required to allocate the memory space to all the tensors, thereby achieving the object of reducing the memory space occupied by the calculation models.

Optionally, in one embodiment, the determining the target tensor of each of the plurality of target calculation models which a memory occupancy is needed during the calculation process includes:

(1) performing a topology analysis on each target calculation model to obtain a topology of operators in each target calculation model;

(2) sorting depth priorities of the operators in each target calculation model according to the topology to obtain sorting information;

(3) grouping each target calculation model into a plurality of operator sets according to the sorting information of each target calculation model; and (4) determining the target tensor of the operator sets included in each of the plurality of target calculation models which the memory occupancy is needed during the calculation process.

The operator set at least includes one predetermined type of operator, and the shape of an input tensor and the shape of an output tensor of the predetermined type of operator are different.

It should be noted that, a calculation model is a net structure from a macro perspective, and is formed by many different types of operators. For example, referring to FIG. 3, the circles in the drawing represent different operators, and a line between any two circles indicates the connection and the direction of data flow of the two corresponding operators.

Figure 3:
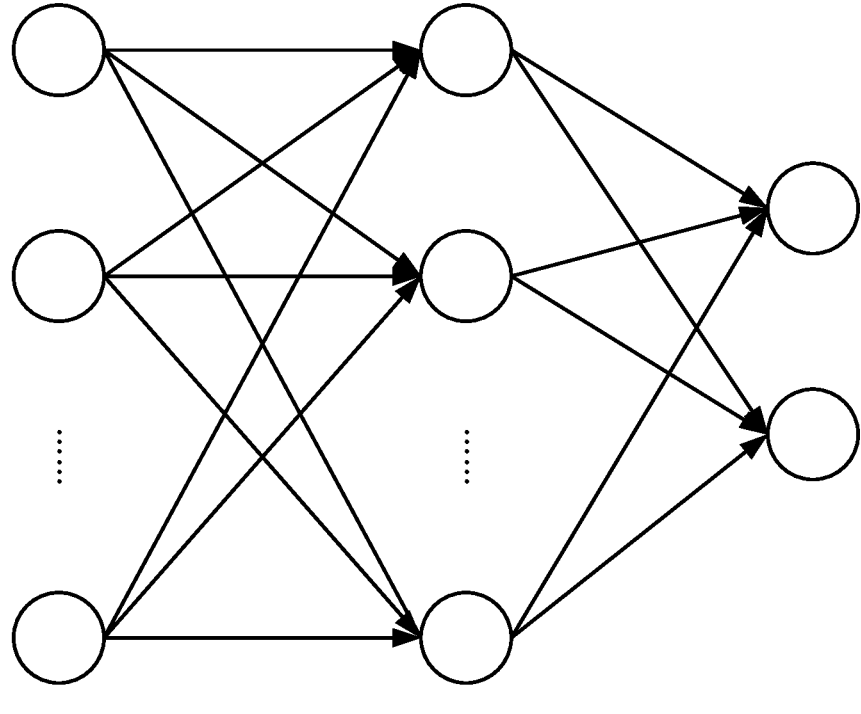
FIG. 3 is a schematic diagram of a topology of a network model in an embodiment of the present application.

In an embodiment of the present application, the electronic apparatus first performs a topology analysis on each target calculation model to thereby obtain the topology of the operators in each target calculation model, wherein the topology describes the connections and the data flows of the operators in the target calculation model. As shown in FIG. 3, the topology of each target calculation model may be visually presented in form of a directed acyclic graph.

After the topology analysis on all the target calculation models is complete and the topology of each target calculation model is obtained, the electronic device further sorts depth priorities of the operators in each target calculation model according to the topology of each target calculation model to obtain corresponding sorting information.

Figure 4:
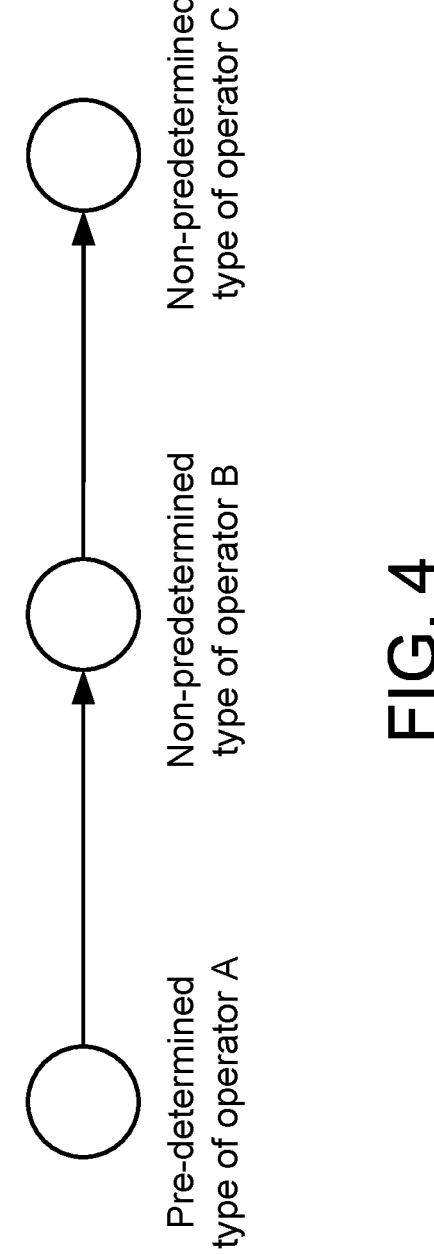
FIG. 4 is a diagram of an exemplary topology of an operator set grouped in an embodiment of the present application.

After the sorting of all the target calculation models is complete and the sorting information corresponding to each target calculation model is obtained, the electronic device further groups each target calculation model into a plurality of operator sets according to the sorting information of each target calculation model. The operator set includes at least one predetermined type of operator, and the shape of an input tensor and the shape of an output tensor of the predetermined type of operator are different. For example, referring to FIG. 4, a grouped operator set includes three operators, which are an operator A in a predetermined type, an operator B in a non-predetermined type, and an operator C in a non-predetermined type that are sequentially connected. The shapes of the input tensors and the output tensors of the non-predetermined types of operators are the same, and such operators may include, for example but not limited to, addition operators, subtraction operators, multiplication operators, division operators and activation operators.

After grouping of all the target calculation models is complete, the electronic device further determines, according to the configured tensor determination policy, the target tensor of the operator set included in each target calculation model which a memory occupancy is needed during the calculation process.

In an embodiment of the present application, a complete target calculation model is grouped into a plurality of operator sets, and the operator sets are used as objects of memory allocation. Compared to using an entire target calculation model as an object of memory allocation, the embodiment of the present application is capable of enhancing the accuracy of memory allocation.

In one embodiment, when grouping the operator sets, the electronic apparatus may group, according to the sorting information of each target calculation model and constraints that the first operator of the operator set is used as a predetermined type of operator and a predetermined type of operator does not cross the non-predetermined type of operator, a non-predetermined type of operator connected to the predetermined type of operator and the predetermined type of operator into the same operator set.

Figure 5:
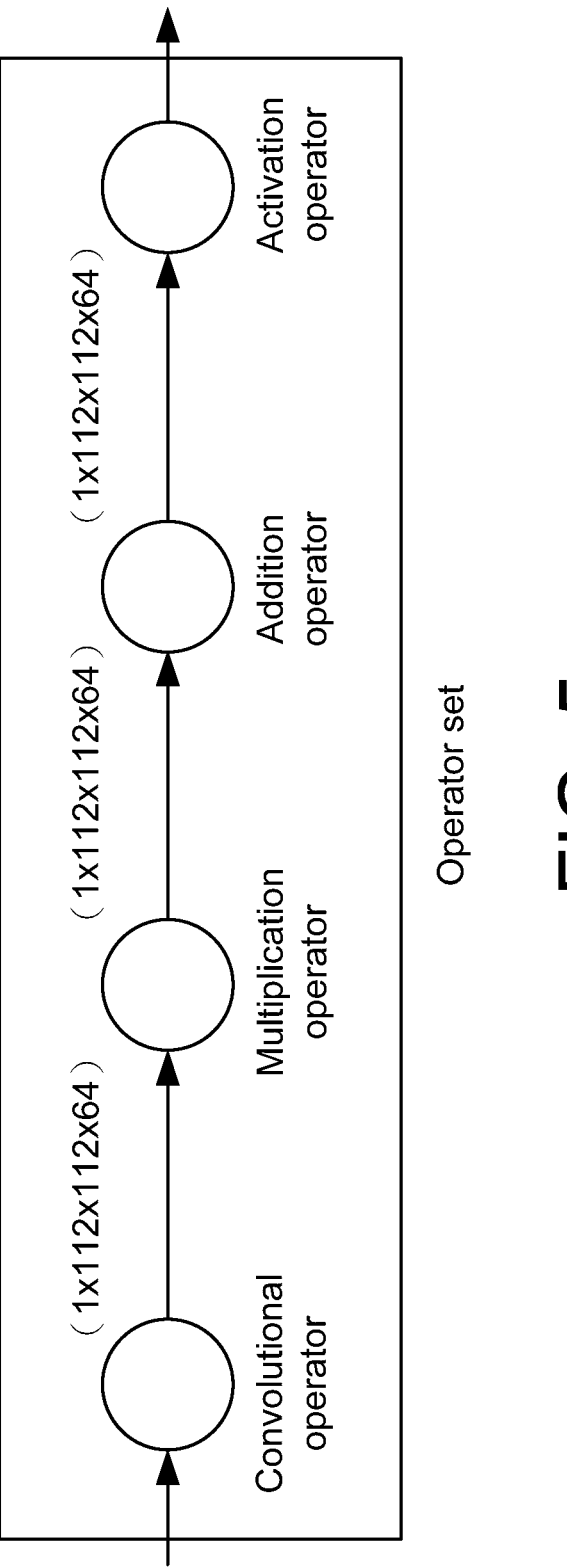
FIG. 5 is a diagram of an exemplary topology of another operator set grouped in an embodiment of the present application.

For example, referring to FIG. 5 showing an operator set, the first operator in the operator set is a convolutional operator, and a multiplication operator, an addition operator and an activation operator that are sequentially connected. The convolutional operator is a predetermined type of operator, and the multiplication operator, the addition operator and the activation operator are non-predetermined types of operators. As shown in FIG. 5, the shape of the output tensor of the convolutional operator is (1×112×112×64); the input tensor of the multiplication operator is the output tensor of the convolutional operator, and the output tensor of the multiplication operator has a same shape as that of the input tensor thereof and is also (1×112×112×64); the input tensor of the addition operator is the output tensor of the multiplication operator, and the output tensor of the addition operator has a same shape as that of the input tensor thereof and is similarly (1×112×112×64); the input tensor of the activation operator is the output tensor of the addition operator, and the output tensor of the activation operator has a same shape as that of the input tensor thereof and is similarly (1×112×112×64).

On the basis of the grouping method for the operator set provided according to an embodiment of the present application, when determining the target tensor of operator set included in each target calculation model which a memory occupancy is needed during the calculation process, the electronic apparatus may determine the input tensors and output tensors of the operator sets included in each target calculation model as the target tensor.

It is to be understood by a person skilled in the art that, for an operator set grouped in an embodiment of the present application, the shapes of the tensors in the operator set are the same from an overall perspective, and only the shapes of the input tensor (i.e., the input tensor of the first predetermined type of operator) and the output tensor (i.e., the output tensor of the last non-predetermined type of operator; if an operator set includes only one predetermined type of operator but not a non-predetermined type of operator, the output tensor of the operator set is the output tensor of the non-predetermined type of operator) are different. Thus, in an embodiment of the present application, memory allocation is performed for only the input tensor and the output tensor of the operator set, which are correspondingly set as the target tensor, and the tensors in the operator sets may be carried by a buffer and memory allocation thereto is not required.

Optionally, in one embodiment, when the target memory space occupied by each target calculation model during the calculation process is determined, the electronic apparatus performs memory allocation for each target calculation model according to the lifecycles of the target tensors and the constraint that a target tensor in the living state occupies the memory space and a memory space for a target tensor in a non-living state is released, to obtain a pre-allocated memory space.

It should be noted that, such pre-allocation does not physically allocate a memory, but is only a prediction process; that is, it is ensured that a target tensor in the living state can occupy space, and that the memory space occupied by the target tensor is released when the target tensor is switched to the non-living state for repeated use of other target tensors in the living state. Thus, a maximum value of the memory space needed by the target calculation model for calculation can be obtained, and be used as the pre-allocated memory space.

For example, when the target tensor A switches from the non-living state to the living state, a memory space in an size actually needed is pre-allocated to the target tensor A. When the target tensor A is switched from the living state to the non-living state, the memory space allocated to the target tensor A is released, and the released space can be again allocated to another target tensor switched from the non-living state to the living state so that pre-allocating a new memory space to such target sensor is not required.

As described above, the pre-allocated memory space is the maximum value of the memory space needed by the predicted target calculation model for calculation, and so the memory space pre-allocated to each target calculation model may be determined as the target memory space of the memory space occupied during the calculation process of each target calculation model.

Optionally, in one embodiment, the process of pre-allocating a memory space for each target calculation model includes: when the target tensor switches from the non-living state to the living state, if the released memory space is sufficient for occupancy by the target tensor, pre-allocating the memory space from the released memory space to the target tensor.

Figure 6:
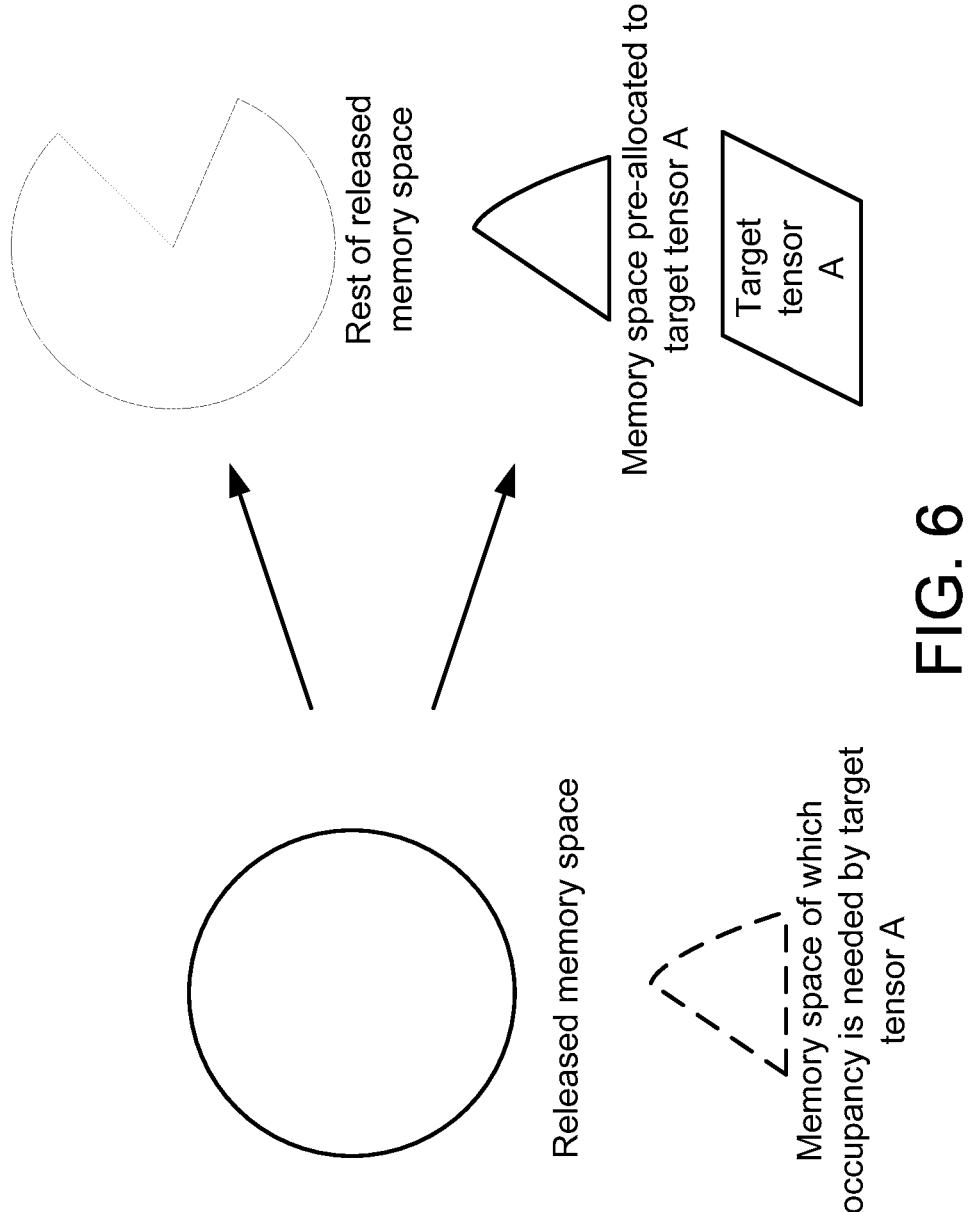
FIG. 6 is a schematic diagram of pre-allocating memory spaces in an embodiment of the present application.

For example, referring to FIG. 6, when the target tensor A is switched from the non-living state to the living state, the electronic apparatus identifies that whether a memory space previously allocated to another target tensor but currently released is sufficient for occupancy by the target tensor A. As shown in FIG. 6, the currently released memory space is sufficient for occupancy by the target tensor A. At this point, the electronic apparatus pre-allocates the memory space in a size required from the released memory space to the target tensor A, and the rest of the released memory space may then be pre-allocated to another target tensor when needed.

Figure 7:
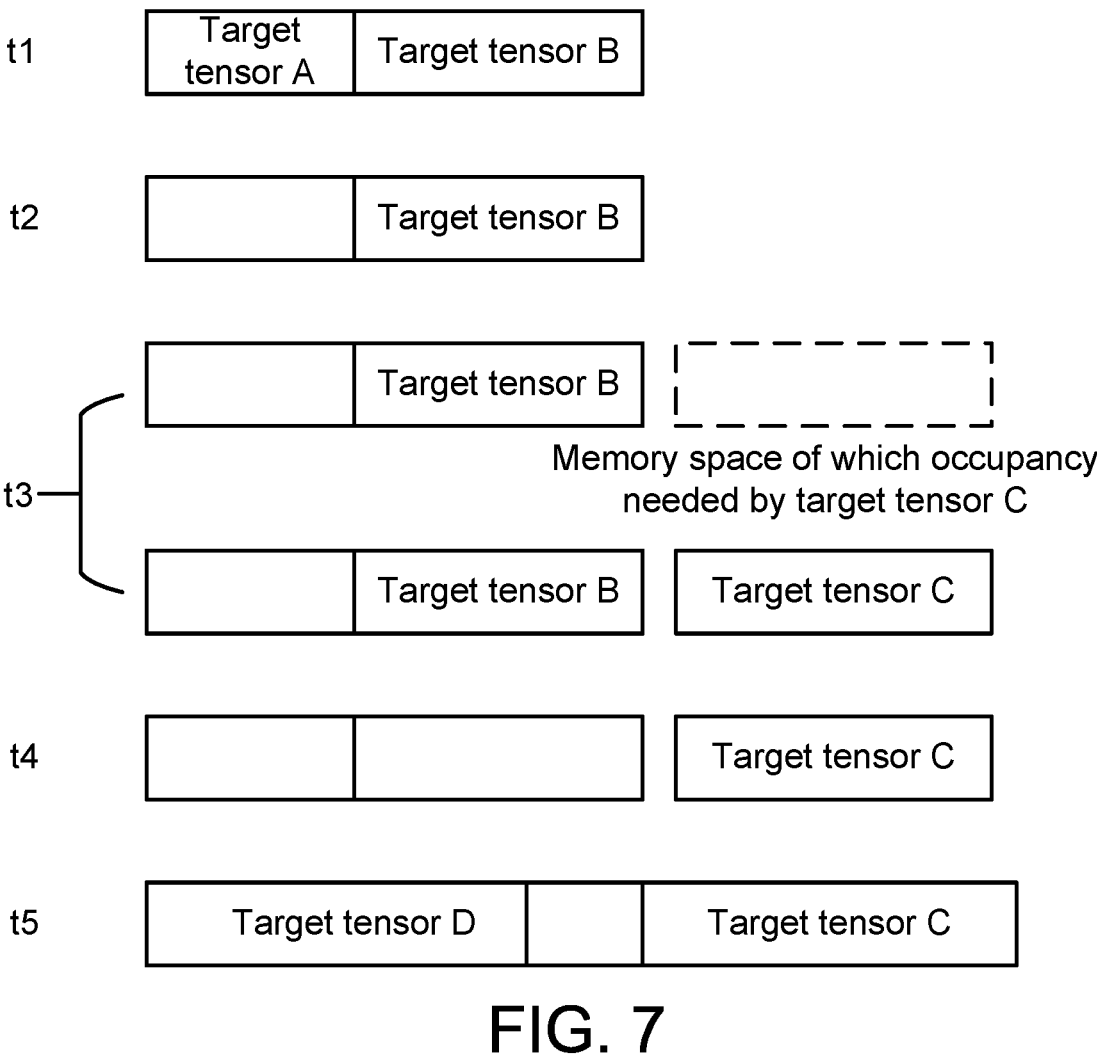
FIG. 7 is another schematic diagram of pre-allocating memory spaces in an embodiment of the present application.

Moreover, when the target tensor is switched from the non-living state to the living state, if the released memory is insufficient for occupancy by the target tensor, a new memory space is pre-allocated to the target tensor. For example, referring to FIG. 7, at a timing t1, the target tensor A and the target tensor B are switched from the non-living state to the living state. At this point, since no released memory space is available, the electronic apparatus pre-allocates a memory space in a size required for occupancy by the target tensor A and the target tensor B. At a timing t2, the target tensor A is switched from the living state to the non-living state, and the electronic apparatus correspondingly releases the memory space allocated to the target tensor A. At a timing t3, the target tensor C is switched from the non-living state to the living state, with however the currently released memory space insufficient for occupancy by the target tensor C. At this point, the electronic apparatus pre-allocates a new memory space for the target tensor C, and the total memory space for carrying the target tensors is correspondingly increased. At a timing t4, the target tensor B is switched from the living state to the non-living state, and the electronic apparatus correspondingly releases the memory space allocated to the target tensor B. At a timing t5, the released memory space includes the memory space previously pre-allocated to the target tensor A and the memory space previously pre-allocated to the target tensor B. At this point, the target tensor D is switched from the non-living state to the living state and the released memory space is sufficient for occupancy by the target tensor D, and so the electronic apparatus correspondingly pre-allocates the memory space from the released memory space to the target tensor D.

In overall, in an embodiment of the present application, a memory space is pre-allocated according to the constraints that a target tensor in the living state occupies a memory space and a memory space is released from a target tensor in the non-living state; that is, when a memory space is pre-allocated, the memory space is first pre-allocated from the released memory space for a target tensor in the living state, and if the released memory space is insufficient for occupancy by the target tensor, a new memory space is pre-allocated to the target tensor.

Optionally, in one embodiment, the process of pre-allocating the memory space for each target calculation model further includes: (1) determining that target tensor pair of an input/output relationship existing in the target tensor of each target calculation model, wherein the target tensor pair includes an input target tensor and a corresponding output target tensor; and (2) for each target tensor pair, if the input target tensor therein is not used again after being inputted, pre-allocating the same memory space to the target tensor pair.

It should be noted that, for the input and output of a single layer, the input tensor and the corresponding output tensor exist at the same time, data is calculated one set after another, and if the input tensor is not used for a second time after being used once, the memory space occupied by the input tensor may be re-written, so that the output tensor is allowed to repeatedly use to a certain extent the memory space of the corresponding input tensor.

Correspondingly, in an embodiment of the present application, when pre-allocating the memory space for each target calculation model, the electronic apparatus further determines the target tensor pair of an input/output relationship existing in the target tensor of each target calculation model, and the target tensor pair includes the input target tensor and the corresponding output target tensor.

Figure 8:
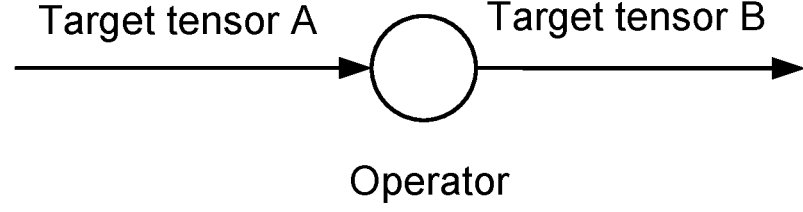
FIG. 8 is a diagram of an example of a target tensor pair in an embodiment of the present application.

For example, referring to FIG. 8, there are two target tensors, namely a target tensor A and a target tensor B, wherein the target tensor A is the input target tensor of the operator shown, and the target tensor B is the output target tensor of the operator shown. Correspondingly, the target tensor A and the target tensor B form a target tensor pair, wherein the target tensor A is the input target tensor, and the target tensor B is the output target tensor.

After the target tensor pair in the target calculation model is determined, for each target tensor pair in the target calculation model, if the input target tensor is not used again after being inputted, the same memory space is pre-allocated to the target tensor pair; that is, the output target tensor in the target tensor pair repeatedly uses the memory space of the input target tensor.

Figure 9:
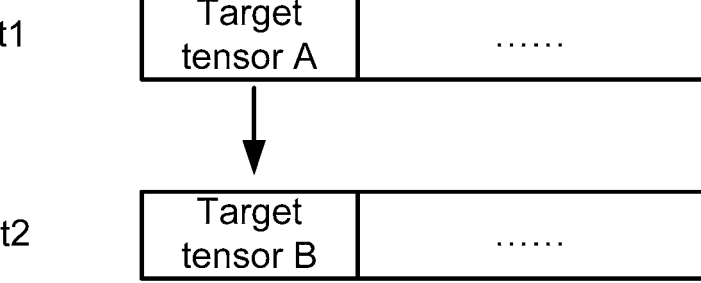
FIG. 9 is a schematic diagram of pre-allocating memory spaces for a target tensor pair shown in FIG. 8.

For example, referring to FIG. 9, at the timing t1, the electronic apparatus pre-allocates the memory space to the target tensor A. At the timing t2, the target tensor A is read to the buffer for calculation, and the target tensor A is not to be used again. Thus, the electronic apparatus releases the memory space pre-allocated to the target tensor A, and pre-allocates the released memory space to the target tensor B, wherein the target tensor B is the target tensor outputted after performing calculation on the target tensor A.

Optionally, in one embodiment, after setting the largest of the memory spaces occupied by the plurality of target calculation models as the total memory space occupied by the plurality of target calculation models during the calculation process, the method further includes: allocating the total memory space to the plurality of target calculation models, wherein each target calculation model repeatedly uses the memory.

As described above, the total memory space is the largest of the target memory spaces occupied by the plurality of target calculation models during the calculation process, and the total memory space can satisfy the calculation requirement of each target calculation model. Thus, a memory region in the size of the total memory space may be allocated to the plurality of target calculation models, wherein each target calculation model repeatedly uses the memory region in the size of the total memory space.

It should be noted that, details of the target calculation model occupying the memory may be referred from the corresponding implementation details of the memory pre-allocation process above, and shall be omitted herein.

Optionally, in one embodiment, after allocating the total memory space to the plurality of target calculation models, the method further includes: during the calculation process of each target calculation model, carrying non-target tensors in each operator set by a predetermined buffer.

Through the associated description above, a person skilled in the art can understand that, each target calculation model includes a plurality of operators sets, and for each operator set, the shapes of the non-target tensors in the operator set are the same and do not need to be carried by a memory. Correspondingly, in an embodiment of the present application, during the calculation process of each target calculation model, the electronic apparatus carries by a predetermined buffer the non-target tensors in each of the operator sets included therein. For example, referring to FIG. 5, in the operator set shown in FIG. 5, the tensors between the convolutional operator and the activation operators are all non-target tensors, which are carried by the electronic apparatus using a predetermined buffer.

It should be noted that, the embodiment of the present application imposes no limitations on the configuration of the predetermined buffer, and the configuration may be performed by a person skilled in the art according to actual requirements, for example, configured as an internal cache of a processor of the electronic apparatus.

Optionally, after allocating the total memory space to the plurality of target calculation models, the method further includes:

during the calculation process of each target calculation model, when a non-occupied memory space in the total memory space is sufficient for occupancy by the target tensor but the largest empty block of the non-occupied memory space is insufficient for occupancy by the target tensor, performing a memory organization operation on the non-occupied memory space.

In an embodiment of the present application, in order to ensure stable memory occupancy by the target tensor, during the calculation process of each target calculation model, the electronic apparatus determines in real time whether the non-occupied memory space in the total memory space (including the released memory space and any previously non-occupied memory space) is sufficient for occupancy by the target tensor. If so, the electronic apparatus determines whether the largest empty block of the non-occupied memory space is sufficient for the target tensor; if the largest empty block of the non-occupied memory space is insufficient for occupancy by the target tensor, the electronic apparatus performs a memory organization operation on the non-occupied memory space.

Figure 10:
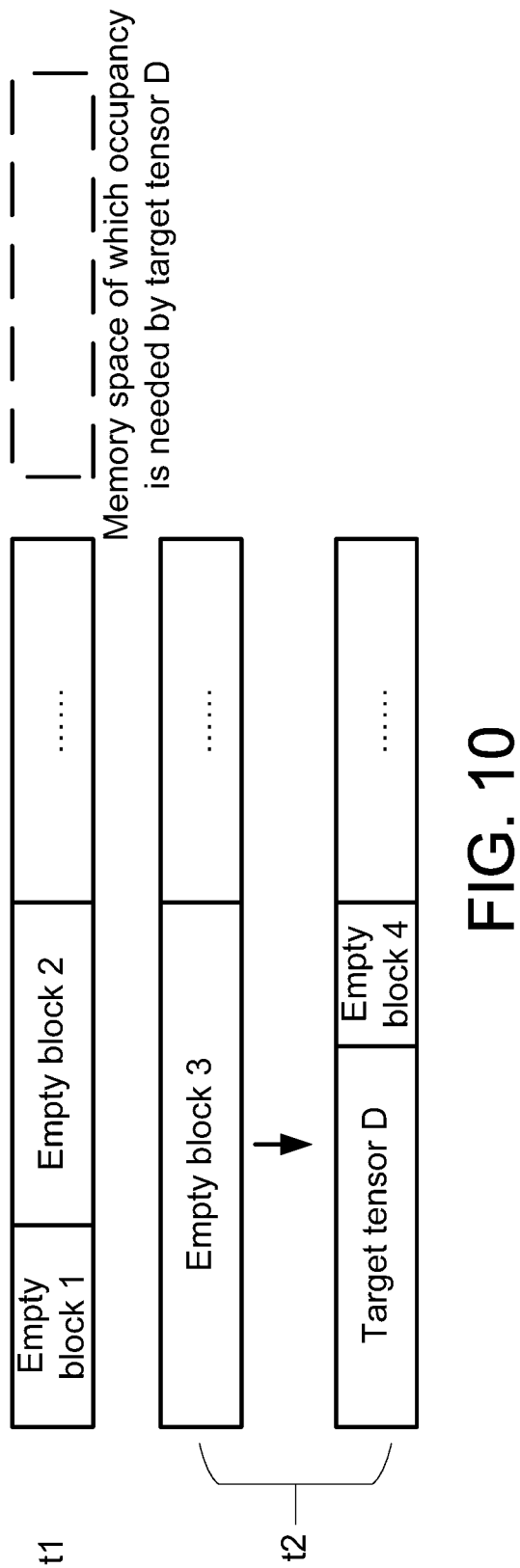
FIG. 10 is a schematic diagram of a memory organization operation performed in an embodiment of the present application.

For example, referring to FIG. 10, at the timing t1, the target tensor D is switched from the non-living state to the living state. At this point, the non-occupied memory space includes two empty blocks, which are respectively an empty block 1 and an empty block 2, with however, the larger "empty block 2" being insufficient for occupancy by the target tensor D. Correspondingly, the electronic apparatus performs a memory organization operation on the non-occupied memory space, and integrates the empty block 1 and the empty block 2 into a larger empty block 3. Then, the electronic apparatus allocates from the empty block 3 a memory space for occupancy by the target tensor D, and an empty block 4 remains available.

Optionally, in one embodiment, the process of determining the plurality of target calculation models that need memory allocation includes: upon receiving a calculation task, setting a calculation model needed for performing the calculation task received as the target calculation model.

Upon receiving a calculation task, the electronic apparatus sets a calculation model needed for performing the calculation task received as the target calculation model. For example, assume the electronic apparatus is deployed with four calculation models, which are a calculation model A, a calculation model B, a calculation model C and a calculation model D, respectively. Upon receiving a calculation task that needs to be completed with the collaboration of the calculation model A, the calculation model B and the calculation model C, the electronic apparatus correspondingly determines the calculation model A, the calculation model B and the calculation model C as the plurality of target calculation models that need memory allocation.

Optionally, in one embodiment, the target calculation model is a network model.

Referring to FIG. 11, FIG. 11 shows another flowchart of a memory allocation method provided according to an embodiment of the present application. In the description below, the electronic apparatus provided by the present application is used as the execution entity of the memory allocation method and a network model is used as the calculation model for illustrations. As shown in FIG. 11, the process of the memory allocation method provided according to an embodiment of the present application may also be as follows.

In step 201, the electronic apparatus determines a plurality of target network models that need memory allocation.

It should be noted that, intermediate data is generated by the network model during the calculation process, and the intermediate data usually needs to be carried by a memory. Correspondingly, to ensure that the network model can calculate properly, the electronic apparatus needs to allocate a memory to the network model.

Correspondingly, in an embodiment of the present application, the electronic apparatus first determines, according to a configured model determination policy, a plurality of network models that need memory allocation, and denotes these network models as target network models. The embodiment of the present application imposes no specific limitations on the configuration of the model determination policy, and any configuration may be performed by a person skilled in the art according to actual requirements.

In step 202, the electronic apparatus performs a topology analysis for each target network model to obtain a topology of operators in each target network model.

In an embodiment of the present application, for each target network model, the electronic apparatus first performs a topology analysis to thereby obtain the topology of the operators in each target network model, wherein the topology describes connections of the operators and the data flows in the target network model.

In step 203, the electronic apparatus sorts depth priorities of the operators in each target network model according to the topology of each target network model to obtain sorting information.

After the topology analysis on all the target network models is completed and the topology of each target network model is obtained, the electronic apparatus further sorts the depth priorities of the operators in each target network model according to the topology of each target network model to obtain the corresponding sorting information.

In step 204, the electronic apparatus groups, according to the sorting information of each target network model and that the first operator of the operator set is a predetermined type of operator, the predetermined type of operator and a non-predetermined type of operator connected to the predetermined type of operator into the same operator set to correspondingly obtain a plurality of operator sets.

After the sorting on all the target network models is completed and the sorting information corresponding to each target network model is obtained, the electronic apparatus further groups each target network model into a plurality of operator sets according to the sorting information of each target network model.

In step 205, the electronic apparatus determines an input tensor and an output tensor of the operator sets included in each target network model as a target tensor which a memory occupancy is needed.

On the basis of the grouping method for the operator sets provided by the embodiment of the present application, when determining the target tensor of the operator sets included in each target network model which a memory occupancy is needed during the calculation process, the electronic apparatus may determine the input tensor and the output tensor of the operator sets included in each target network model as the target tensor.

In step 206, the electronic apparatus further pre-allocates a memory space to each target network model according to lifecycles of the target tensors and the constraints that a target tensor in a living state occupies a memory space and a memory space for a target tensor in a non-living state is released.

The lifecycle of the target tensor may be understood as an entire cycle of the target tensor from the beginning to the completion of use, and may be divided into two phases, i.e., a living state and a non-living state. On this basis, a space determination policy determined on the basis of the lifecycle is configured, for example, ensuring memory occupancy for only a target tensor in a living state.

In an embodiment of the present application, after the target tensor of each target network model which a memory occupancy is needed during the calculation process is determined, the electronic apparatus further obtains the lifecycles of the target tensors in each target network model. Then, the electronic apparatus pre-allocates a memory space to each target network model according to the lifecycles of the target tensors and the constraints that a target tensor in a living state occupies the memory space and the memory space for a target tensor in a non-living state is released, to obtain a pre-allocated memory space.

In step 207, the electronic apparatus determines the memory space pre-allocated to each target network model as a target memory space of the memory occupied thereby during the calculation process.

As described above, the pre-allocated memory space is the maximum value of the memory space needed by the predicted target network model for calculation, and so the memory space pre-allocated to each target network model may be determined directly as the target memory space of the memory space occupied during the calculation process of each target network model.

In step 208, the electronic apparatus sets the largest of the memory spaces occupied by the plurality of target network models as a total memory space occupied by the plurality of network models during the calculation process.

In an embodiment of the present application, after the memory space occupied by each target network model during the calculation process is determined, the electronic apparatus further sets the largest of the target memory spaces occupied by the plurality of target network models as the total memory space occupied by the plurality of target network models during the calculation process, and the plurality of target network models repeatedly use a memory region in the size of the total memory space for calculation.

Figure 12:
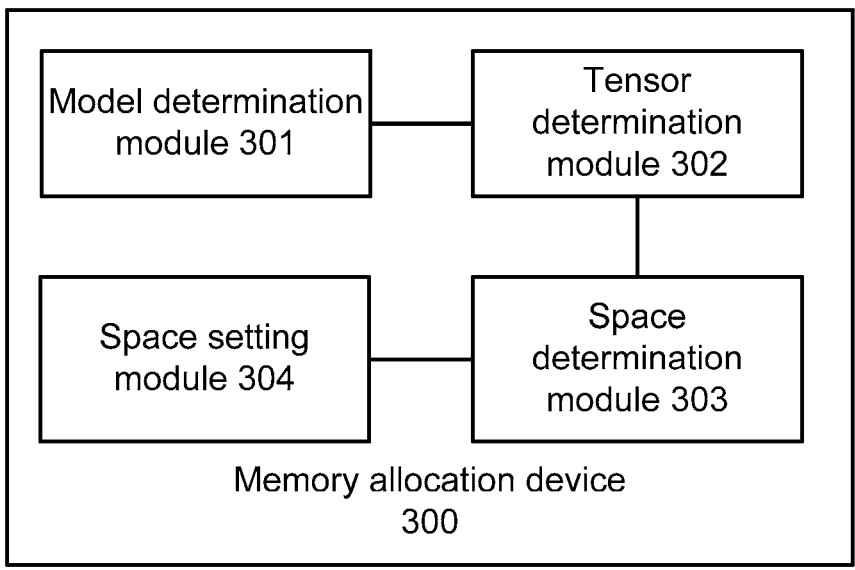
FIG. 12 is a structural schematic diagram of a memory allocation device 300 provided according to an embodiment of the present application.

Referring to FIG. 12, FIG. 12 shows a structural schematic diagram of a memory allocation device 300 provided according to an embodiment of the present application. The memory allocation device 300 is applied to an electronic apparatus, and includes: a model determination module 301, for determining a plurality of target calculation models that need memory allocation; a tensor determination module 302, for determining a target tensor of each target calculation model which a memory occupancy is needed during a calculation process; a space determination module 303, for determining, according to lifecycles of the target tensors in each target calculation model, a target memory space occupied by each target calculation model during the calculation process; and a space setting module 304, for setting a largest of the target memory spaces occupied by the plurality of target calculation models as a total memory space occupied by the plurality of target calculation models during the calculation process.

Optionally, in one embodiment, when determining the target tensor of each target calculation model which a memory occupancy is needed during the calculation process, the tensor determination module 302 is for performing a topology analysis on each target calculation model to obtain a topology of operators in each target calculation model; sorting depth priorities of the operators in each target calculation model to obtain sorting information; grouping each target calculation model into a plurality of operator sets according to the sorting information of each target calculation model; and determining a target tensor of each target calculation model including operator sets which a memory occupancy is need during the calculation process; wherein, the operator set includes at least one predetermined type of operator, and the shape of an input tensor and the shape of an output tensor of the predetermined type of operator are different.

Optionally, in one embodiment, when pre-allocating the memory space to each target calculation model, the space determination module 303 is for, if the released memory space is sufficient for occupancy by the target tensor when the target tensor is switched from the non-living state to the living state, pre-allocating the memory space from the released memory space to the target tensor.

It should be noted that, the memory allocation device 300 provided according to the embodiment of the present application and the memory allocation method in the foregoing embodiments are of the same concept; the memory device 300 can perform any method provided in the embodiments of the memory allocation method above, and associated implementation details may be referred from the description of the foregoing embodiments and are omitted herein.

Figure 13:
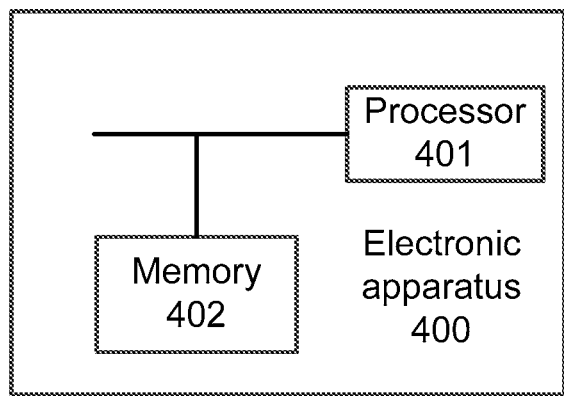
FIG. 13 is a structural schematic diagram of an electronic apparatus 400 provided according to an embodiment of the present application.

An electronic apparatus is further provided according to an embodiment. Referring to FIG. 13, an electronic apparatus 400 includes a processor 401 and a memory 402.

The processor 401 in the embodiment of the present application may be a universal processor, or may be a dedicated processor, for example, a neural network processor.

The memory 402 has a computer program stored therein, and may be a high-speed random access memory or a non-volatile memory, e.g., a disk storage device or a flash memory, or other volatile solid-state storage devices. Correspondingly, the memory 402 may further include a memory controller so as to provide the processor 401 with access to a computer program in the memory 402 and to perform the memory allocation method shown in FIG. 1 and/or FIG. 11. The specific implementation details may be referred from the description of the foregoing embodiments, and are omitted herein.

A memory allocation method and device and an electronic apparatus provided according to the embodiments of the present application are as described in detail above. The principle and implementation details of the present application are described by way of specific examples in the literature, and the illustrations given in the embodiments provide assistance to better understand the method and core concepts of the present application. Variations may be made to specific embodiments and application scopes by a person skilled in the art according to the concept of the present application. In conclusion, the disclosure of the detailed description is not to be construed as limitations to the present application.

What is claimed is:

1. A memory allocation method, applied to an electronic apparatus, the method comprising:

determining a plurality of target calculation models that need memory allocation;

determining a target tensor of each of the target calculation models which a memory occupancy is needed during a calculation process;

determining, according to lifecycles of the target tensors, a target memory space occupied by each of the target calculation models during the calculation process; and determining, according to the target memory spaces occupied by the target calculation models, a total memory space occupied by the target calculation models during the calculation process; and allocating, according to the total memory space, a portion of memory of the electronic apparatus to execute the target calculation models, wherein the determining a target tensor of each of the target calculation models which a memory occupancy is needed during a calculation process comprises:

performing a topology analysis on each of the target calculation models to obtain a topology of operators in each of the target calculation models;

sorting depth priorities of the operators in each of the target calculation models according to the topology to obtain sorting information;

grouping each of the target calculation models into a plurality of operator sets according to the sorting information of each of the target calculation models; and determining the target tensor of the operator sets included in each of the target calculation models which the memory occupancy is needed during the calculation process;

wherein, the operator sets comprise at least one predetermined type of operator, and a shape of an input tensor and a shape of an output tensor of the predetermined type of operator are different.

2. The memory allocation method according to claim 1, wherein the total memory space occupied by the target calculation models during the calculation process is determined according to a largest of the target memory spaces occupied by the target calculation models.

3. The memory allocation method according to claim 1, wherein the grouping each of the target calculation models into the plurality of operator sets according to the sorting information of each of the target calculation models comprises:

grouping, according to the sorting information of each of the target calculation models and that a first operator of the operator set is the predetermined type of operator, the predetermined type of operator and a non-predetermined type of operator connected to the predetermined type of operator into a same operator set.

4. The memory allocation method according to claim 3, wherein the determining the target tensor of the operator sets included in each of the target calculation models which the memory occupancy is needed during the calculation process comprises:

determining an input tensor and an output tensor of the operator sets included in each of the target calculation models as the target tensor.

5. The memory allocation method according to claim 1, further comprising:

allocating the total memory space to the target calculation models, wherein each of the target calculation models repeatedly uses a memory region.

6. The memory allocation method according to claim 1, further comprising:

during the calculation process of each of the target calculation models, carrying a non-target tensor in each operator set included therein by a predetermined buffer.

7. The memory allocation method according to claim 5, further comprising, during the calculation process of each of the target calculation models, when a non-occupied memory space in the total memory space is sufficient for occupancy by the target tensor but a largest empty block in the non-occupied memory space is insufficient for occupancy of the target tensor, performing a memory organization operation on the non-occupied memory space.

8. An electronic apparatus, comprising a processor and a memory, the memory having a computer program stored therein, wherein when the computer program executed by the processor it performs a memory allocation method, the memory allocation method comprises:

determining a plurality of target calculation models that need memory allocation;

determining a target tensor of each of the target calculation models which a memory occupancy is needed during a calculation process;

determining, according to lifecycles of the target tensors, a target memory space occupied by each of the target calculation models during the calculation process;

determining, according to the target memory spaces occupied by the target calculation models, a total memory space occupied by the target calculation models during the calculation process; and allocating, according to the total memory space, a portion of memory of the electronic apparatus to execute the target calculation models, wherein the determining a target tensor of each of the target calculation models which a memory occupancy is needed during a calculation process comprises:

performing a topology analysis on each of the target calculation models to obtain a topology of operators in each of the target calculation models;

sorting depth priorities of the operators in each of the target calculation models according to the topology to obtain sorting information;

grouping each of the target calculation models into a plurality of operator sets according to the sorting information of each of the target calculation models; and determining the target tensor of the operator sets included in each of the target calculation models which the memory occupancy is needed during the calculation process;

wherein, the operator sets comprise at least one predetermined type of operator, and a shape of an input tensor and a shape of an output tensor of the predetermined type of operator are different.

9. A memory allocation method, applied to an electronic apparatus, the method comprising:

determining a plurality of target calculation models that need memory allocation;

determining a target tensor of each of the target calculation models which a memory occupancy is needed during a calculation process;

determining, according to lifecycles of the target tensors, a target memory space occupied by each of the target calculation models during the calculation process;

determining, according to the target memory spaces occupied by the target calculation models, a total memory space occupied by the target calculation models during the calculation process; and allocating, according to the total memory space, a portion of memory of the electronic apparatus to execute the target calculation models, wherein the determining, according to the lifecycles of the target tensors, the target memory space occupied by each of the target calculation models during the calculation process comprises:

pre-allocating, according to the lifecycles of the target tensors and constraints that a target tensor in a living state occupies a memory space and a memory space for a target tensor in a non-living state is released, the memory space to each of the target calculation models; and determining the memory space pre-allocated to each of the target calculation models as the target memory space of the memory occupied by each of the target calculation models during the calculation process.

10. The memory allocation method according to claim 9, wherein the pre-allocating the memory space to each of the target calculation models comprises:

when the target tensor is switched from the non-living state to the living state, if the released memory space is sufficient for occupancy by the target tensor, pre-allocating the memory space from the released memory space to the target tensor.

11. The memory allocation method according to claim 10, further comprising:

if the released memory space is insufficient for occupancy by the target tensor, pre-allocating a new memory space to the target tensor.

12. The memory allocation method according to claim 9, wherein the pre-allocating the memory space of each of the target calculation models further comprises:

determining a target tensor pair of an input/output relationship existing in the target tensor of each of the target calculation models, wherein the target tensor pair comprises an input target tensor and an output target tensor; and for each target tensor pair, if the input target tensor therein is not used again after being inputted, pre-allocating the same memory space to the target tensor pair.

* * * * *